UNITED STATES PATENT OFFICE.

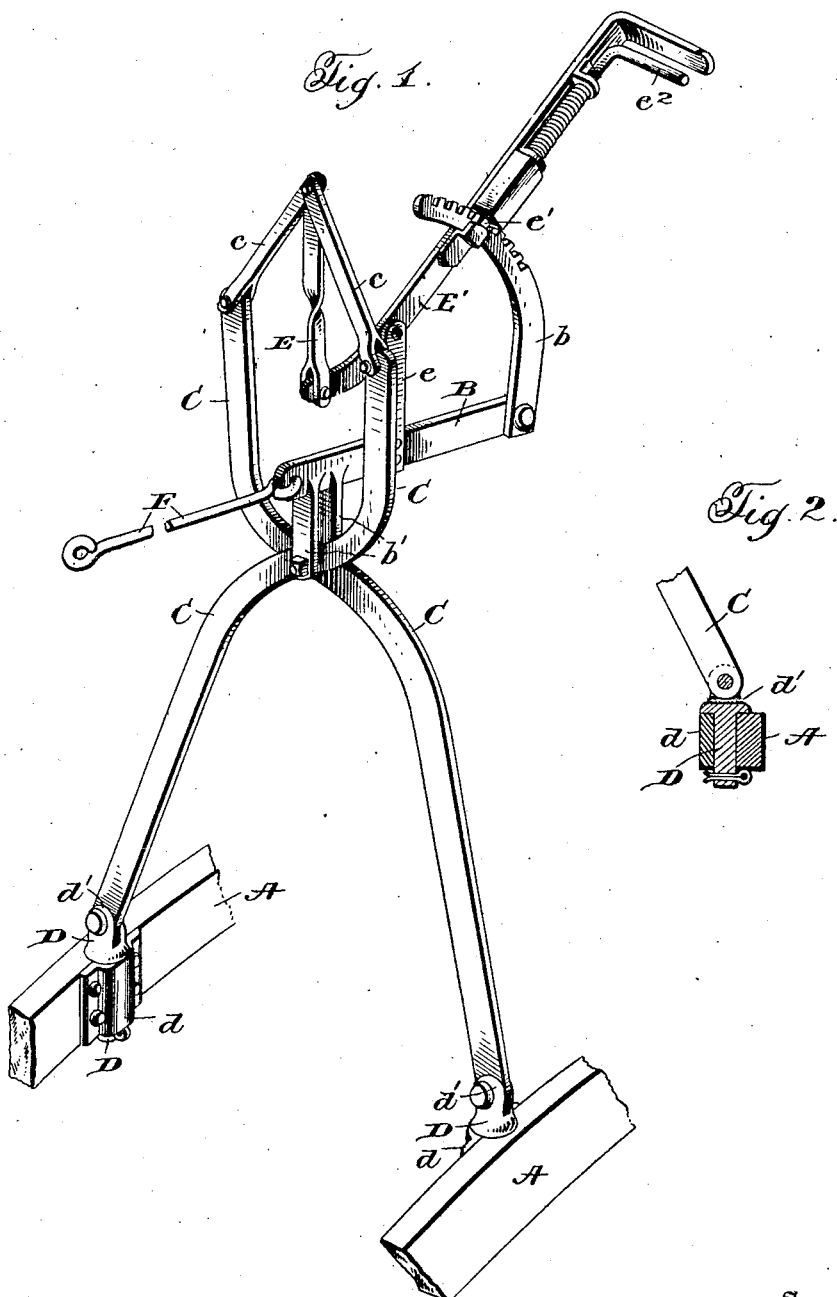

WILLIAM NEWTON THORNTON, OF CEDAR HILL, TEXAS.

HOPPLE OR REGULATOR FOR PLOWS.

No. 851,710.  Specification of Letters Patent.  Patented April 30, 1907.

Application filed December 15, 1906. Serial No. 348,048.

*To all whom it may concern:*

Be it known that I, WILLIAM NEWTON THORNTON, a citizen of the United States, residing at Cedar Hill, in the county of Dallas and State of Texas, have invented certain new and useful Improvements in Hopples or Regulators for Cultivator-Plows, of which the following is a specification.

This invention relates to an improvement in an attachment for cultivators plows, and the object of the invention is the provision of an attachment for varying the width between the plow beams, which can be readily secured to any of the ordinary forms of cultivator plows so that the actuating handle thereof will be positioned within easy reach of the operators seat.

Other objects of the invention will be apparent from the detailed description hereinafter, when read in connection with the accompanying drawings forming a part hereof, wherein a preferable embodiment of my invention is shown, and wherein like numerals of reference refer to similar parts in the several views.

In the drawings, Figure 1 is a perspective view of my improved attachment, showing the manner of supporting the same upon the beams of the cultivator, and Fig. 2 is a detail view showing the manner of connecting the ends of the spreader arms to the cultivator beams.

Referring now more particularly to the drawings, A A designate the beams of the cultivator, which may be of any desired construction.

B designates a bar, which is adapted when the attachment is secured in position upon the cultivator to extend longitudinally thereof, and is provided at its rear end with an upwardly extending curved rack $b$, and at its forward end with a pair of depending ears $b'$. Pivotally secured intermediate the ends thereof, between the depending ears $b'$ of the bar B are a pair of crossed arms C C, the lower ends of which are designed to be secured in any suitable manner to the beams A A of the cultivator.

The preferred manner of connecting the lower ends of the arms C C with the beams A A of the cultivator is by means of bolts D, which are loosely mounted in suitable bearings $d$ secured to the beams A A and the upper ends of which terminate in separated ears $d'$, between which the lower ends of the bars C C are pivotally secured. The bolts D are held against accidental displacement from the bearings $d$ by suitable cotter pins engaging the lower ends thereof. The upper ends of the arms C C, are connected by a pair of links $c$, the lower ends of which are pivotally secured to the upper ends of said arms and the upper ends of which are connected to each other by a suitable pivot bolt.

Depending from and loosely mounted upon the pivot bolt which connects the forward ends of the links $c$, is a link E, the lower end of which is pivotally connected to the upper end of a rearwardly extending actuating lever E', which is fulcrumed upon a suitable support $e$ which is mounted upon the bar B. The lever E' travels along the curved rack $b$ extending upwardly from the bar B and is provided with a spring pressed dog $e'$ of any suitable construction, which is adapted to normally engage one of the teeth of said rack. A suitable handle $e^2$ is provided for withdrawing the dog $e'$ from engagement with the teeth of the rack $b$, both said handle and the handle of the actuating lever being readily accessible to an operator while occupying the seat of the cultivator.

F designates a rigid link, one end of which is loosely connected to the forward end of the bar B, and the opposite end of which is adapted to be loosely connected in any suitable manner to the tongue or any other fixed part of the cultivator. The bar F maintains the attachment in a vertical position, at the same time permitting it to rock or sway with the movement of the cultivator.

From the above description, it will be apparent that by actuating the lever E' the beams of the cultivator may be adjusted to any desired extent and that such adjustment may be affected by the operator during the travel of the cultivator.

I do not desire to limit myself to the precise form and construction shown in the drawings, as it is obvious that many minor changes may be made thereto without departing from the spirit of the invention, as defined in the appended claims.

Having thus described the invention, what is claimed is:—

1. An attachment for cultivators comprising a bar adapted to extend longitudinally of the cultivator, a pair of crossed arms pivotally secured to said bar and adapted to be connected at their lower ends to the beams of the cultivator a lever pivotally secured to said bar, and means connecting the lever and the upper ends of said arms for spreading and contracting the arms upon actuation of the lever.

2. An attachment for cultivators comprising a bar adapted to extend longitudinally of the cultivator, a pair of crossed arms pivotally secured to said bar and adapted to be connected at their lower ends to the beams of the cultivator, links connecting the upper ends of said arms, an actuating lever supported by said bar, and a connection between the actuating lever and the links connecting the upper ends of said bars.

3. An attachment of the character described comprising a bar adapted to extend longitudinally of the cultivator, a pair of crossed arms pivotally secured to said bar and adapted to be connected at their lower ends to the beams of the cultivator, a pair of links connecting the upper ends of said arms, a rearwardly extending actuating lever fulcrumed on said bar, and a link connection between the forward end of said actuating lever and the links connecting the upper ends of the crossed arms.

4. An attachment for cultivators comprising a bar adapted to extend longitudinally of the cultivator, a pair of crossed arms pivotally secured to said bar and adapted to be connected at their lower ends to the beams of the cultivator, a pair of links connecting the upper ends of said arms, a rearwardly extending actuating lever fulcrumed on said bar, a link depending from the pivotal connection of the two links connecting the upper ends of the crossed arms, and pivotally connected at its lower end to the forward end of the actuating lever, and means for holding said lever in various positions of adjustment.

5. An attachment for cultivators comprising a bar adapted to extend longitudinally of the cultivator and provided at its rear end with an upwardly extending rack and at its forward end with a depending lug, a pair of crossed arms pivotally connected to the lug depending from said bar, and adapted to be connected at their lower ends to the beams of the cultivator, an actuating lever fulcrumed on said bar and provided with a dog engaging the rack extending upwardly therefrom, and connections between the forward end of said actuating lever and the upper ends of the crossed bars for spreading and contracting the bars.

6. An attachment for cultivators comprising a bar adapted to extend longitudinally of the cultivator and provided at its rear end with an upwardly extending rack and at its forward end with a depending lug, a pair of crossed arms pivotally connected to the lug depending from said bar and adapted to be connected at their lower ends to the beams of the cultivator, a pair of links connecting the upper ends of said arms, a rearwardly extending actuating lever fulcrumed on said bar and provided with a dog engaging the rack extending upwardly therefrom, and a connection between the actuating lever and the links connecting the upper ends of said bars.

7. An attachment for cultivators comprising a bar adapted to extend longitudinally of the cultivator, a pair of arms pivotally connected to said bar and adapted to be connected at their lower ends to the beams of the cultivator, a lever pivotally secured to said bar, and means connecting the lever and said arms for spreading and contracting the arms upon actuation of the lever.

In testimony whereof I have signed my name to this specification in the presence of two subscribing witnesses.

his
WILLIAM NEWTON  ✕  THORNTON.
       mark

Witnesses:
 R. C. ANDERSON,
 M. HEAFER.